(12) United States Patent
Geltinger

(10) Patent No.: US 11,376,780 B2
(45) Date of Patent: Jul. 5, 2022

(54) APPARATUS AND METHOD FOR TREATING PLASTIC PREFORMS WITH INTEGRATED PREFORM FEED

(71) Applicant: KRONES AG, Neutraubling (DE)

(72) Inventor: Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/106,426

(22) Filed: Nov. 30, 2020

(65) Prior Publication Data

US 2021/0283821 A1 Sep. 16, 2021

(30) Foreign Application Priority Data

Mar. 10, 2020 (DE) ..................... 10 2020 106 422.5

(51) Int. Cl.
*B29C 49/42* (2006.01)
*B29C 49/64* (2006.01)
(Continued)

(52) U.S. Cl.
CPC .......... *B29C 49/38* (2013.01); *B29C 49/4205* (2013.01); *B29C 49/6409* (2013.01); *B29C 2049/4221* (2013.01)

(58) Field of Classification Search
CPC . B29C 49/4205; B29C 49/6409; B29C 49/68; B65G 15/14; B65G 47/1492; B65G 51/035; B65G 15/105
See application file for complete search history.

(56) References Cited

U.S. PATENT DOCUMENTS 9,561,614 B2 * 2/2017 Novak ............... B65G 47/1435
2008/0142339 A1 * 6/2008 Charpentier ........... B65G 15/14
198/626.1

(Continued)

FOREIGN PATENT DOCUMENTS

DE 20308513 7/2004
EP 2221261 A1 * 8/2010 ............... B07C 5/02
(Continued)

OTHER PUBLICATIONS

Extended European Search Report dated May 19, 2021 issued in corresponding European Application No. 20000473.

*Primary Examiner* — Robert B Davis
(74) *Attorney, Agent, or Firm* — Onello & Mello, LLP

(57) ABSTRACT

Apparatus (1) for treating plastic preforms (10) with a preform sorting device (2) comprising a sorting device (3) and a damming device (5) which transports the plastic preforms (10) along a first rectilinear transport path (T1), wherein the sorting device (3) is suitable and intended to bring the plastic preforms (10) into a predetermined orientation and the damming device (5) is suitable and intended to feed the plastic preforms (10) in an ordered manner to a heating device (12) arranged downstream of the preform sorting device (2), which heats the plastic preforms (10) to a temperature necessary for blow moulding, wherein the heating device (12) transports the plastic preforms (10) along a substantially second rectilinear transport path (T2) and a plurality of stationary arranged heating elements (14) are arranged along the second rectilinear transport path (T2). According to the invention, the preforms sorting device (2) and the heating device (12) are arranged on a common carrier (9).

17 Claims, 2 Drawing Sheets

(51) Int. Cl.
 *B29C 49/68* (2006.01)
 *B29C 49/38* (2006.01)

(56) References Cited

U.S. PATENT DOCUMENTS

| | | | |
|---|---|---|---|
| 2009/0243161 A1* | 10/2009 | Beale | B29C 49/4252 |
| | | | 264/535 |
| 2012/0312661 A1* | 12/2012 | Bianchini | B65G 15/105 |
| | | | 198/604 |
| 2021/0114279 A1 | 4/2021 | Schroeter et al. | |

FOREIGN PATENT DOCUMENTS

| | | |
|---|---|---|
| FR | 2556273 | 6/1985 |
| WO | 2017173477 | 10/2017 |
| WO | 2020011497 | 1/2020 |

\* cited by examiner

APPARATUS AND METHOD FOR TREATING PLASTIC PREFORMS WITH INTEGRATED PREFORM FEED

The present invention relates to an apparatus and method for treating plastic preforms with a preform sorting device and a heating device. Such apparatus and methods have long been known from the prior art. The plastic preforms are usually, prior to forming into plastic containers, fed unordered to a preform sorting device, brought there into the desired orientation and then fed in the correct or predetermined orientation to a subsequent device, such as a heating device.

It is known from the internal prior art of the applicant that the preform feed or the preform sorting device for this purpose is arranged on a specially provided, separate and raised platform next to the machine for producing plastic containers. This has the disadvantage that the preform feed has to be installed in a complicated way in the external assembly, which results in many errors at the interfaces or transfer points to the downstream equipment. Furthermore, the preform sorting device is difficult to access due to its elevated position and is therefore complex in terms of maintenance, operation and the elimination of errors.

An object of the present invention is therefore facilitating accessibility to such preform sorting devices and at the same time arranging the entire system for the production of plastic containers, including the preform feed, in a smaller space.

This object is achieved according to the invention subjects of the independent claims. Advantageous embodiments and modifications are the subject of the subordinate claims.

The invention is therefore directed towards an apparatus for treating plastic preforms, comprising a preform sorting device comprising a sorting device and a damming device which transports the plastic preforms along a first rectilinear transport path, wherein the sorting device is suitable and intended to bring the plastic preforms into a predetermined orientation and the damming device is suitable and intended to supply the plastic preforms in an ordered manner to a heating device arranged downstream of the preform sorting device, which heats the plastic preforms to a temperature necessary for blow moulding, wherein the heating device transports the plastic preforms along a substantially second rectilinear transport path and a plurality of heating elements arranged in a stationary manner are arranged along the second rectilinear transport path.

According to the invention, the preform sorting device and the heating device are arranged on a common carrier.

With the device according to the invention, it is therefore possible to set up and commission the preform feed or preform sorting device directly in the internal assembly and to eliminate the interfaces and efforts in the external assembly, since the preform feed or sorting device is located directly next to or at the actual production line. This means that there is no longer any need for in-house installations for commissioning. In addition, the arrangement of the preforms sorting device and heating device on a common carrier provides for a compact installation with good accessibility, and also significantly reduced transport costs, since shipping is possible with the heating device.

The invention is further directed towards an apparatus for treating plastic preforms, comprising a preform sorting device comprising a sorting device and a damming device which transport the plastic preforms in each case along a first rectilinear transport path, wherein the sorting device is suitable and intended to bring the plastic preforms into a predetermined orientation and the damming device is suitable and intended to supply the plastic preforms in an ordered manner to a heating device arranged downstream of the preform sorting device, which heats the plastic preforms to a temperature necessary for blow moulding, wherein the heating device transports the plastic preforms along a substantially second rectilinear transport path and a plurality of heating elements arranged in a stationary manner are arranged along the second rectilinear transport path.

According to the invention, the preform sorting device and the heating device are arranged parallel to each other. In particular, the preform sorting device, consisting of damming device and sorting device, is therefore arranged parallel to the heating device and preferably arranged directly at the heating device.

Therefore, also with this apparatus a compact installation and good accessibility to the preform sorting device is achieved, as well as reduced transport costs, since the preform sorting device can be shipped together with the heating device.

Transport substantially along a rectilinear transport path means that the transport path can also have curved sections and in particular sections in which the transport path or means of transport is steered via deflection wheels. The feeding of the plastic preforms to the heating device can be a direct feeding of the preforms from the damming device to the heating device, but it is also possible that between the damming device and the heating device other devices such as transport stars, buffer sections or the like are arranged.

However, the preform sorting device is particularly preferably arranged parallel to the heating device and arranged with the heating device on a common carrier or on the same platform. Such an arrangement of the preform sorting device and the heating device allows a much more compact arrangement of the entire line compared to the prior art. Due to the close proximity of the preform sorting device to the heating device, the feeding section for feeding the preforms is also considerably shortened.

Preferably, the transport path of the preform sorting device and the transport path of the heating device run parallel to each other, wherein further preferably also the transport of the plastic preforms in the preforms sorting device and the heating device run parallel to each other. This arrangement of the preform sorting device and the heating device in according to the invention also preferentially integrates the preform feed into the heating device and is preferably coupled to the heating device, which in turn leads to a compact design with reduced space requirements.

The sorting device and the damming device is in each case a specific section of the transport section of the preform sorting device, so that instead of a sorting device and damming device, it can also be referred to as a sorting section and an damming section.

The sorting device is preferably suitable and intended to bring the plastic preforms, which are fed to the preform sorting device as bulk material in a random order, into a (pre)defined orientation. In particular, this is a position which is necessary for the subsequent treatment process, such for example heating the preforms in the heating device. The plastic preforms should particularly preferably be arranged so that the mouth or mouth area of the preforms is directed upwards, i.e. away from the centre of the earth.

For this purpose, the sorting device preferably has two guides, such as rollers or rails, which are spaced apart from each other and between which the preforms are guided or slide along. The distance between the guides is preferably so large that a base body of the preforms can pass between them, but not a support ring of the preforms. Preferably the support ring rests on the rollers or the guides during transport of the preforms. The distance between the rollers or guides is particularly preferably adjustable, so that it can be adapted to different types of preforms. The rollers are preferably driven rollers, wherein preferably the speed of rotation of the rollers is also adjustable.

Furthermore, it would also be conceivable that the sorting device is designed as a disc or rotary disc, which presses the preforms against an outer wall, preferably by rotation and the centrifugal forces resulting from this, and pushes them into the specified orientation by means of a suitable arrangement of guide rails.

The heating device preferably has a circumferential transport means such as for example conveyor belts or holding devices such as clamps arranged on the transport means, which grip the plastic preforms above the support ring. The heating elements are preferably arranged stationary, so that the plastic preforms are moved past them during transport and heated. These heating elements are preferably heating boxes, such as infrared radiators or microwave heating devices. In addition, however, it would also be conceivable to use moving heating elements, such as in particular radiant fingers, which engage in the plastic preforms and simultaneously also serve as holding devices for transporting the plastic preforms.

In a preferred embodiment, the plastic preforms are fed from the preform sorting device to the heating device and in particular to a transport star arranged between the preform sorting device and the heating device in horizontal direction. The plastic preforms are therefore preferably transported in the horizontal direction in the preforms sorting device and the heating device and are particularly preferably transported parallel to each other. This enables a particularly simple design of the preform sorting device and a simple transfer to the heating device.

In another preferred embodiment, at least one air stressing device is provided in the sorting device and/or the damming device, which is suitable and intended to transport the plastic preforms by means of an air flow. The plastic preforms are therefore preferably fed to the heating device and/or to the transport star arranged between the preform sorting device and the heating device via an air-assisted feed. This air-assisted transport of the preforms reduces the frictional surfaces between the preforms and the guides in an advantageous way, thus reducing damage to the preforms.

The damming device is particularly preferably arranged downstream of the sorting device or in the transport direction of the plastic preforms after the sorting device and is preferably suitable and intended to feed the plastic preforms in an orderly manner to the following heating device. In addition, in the damming device the separation of the preforms to each other is preferably changed and especially reduced. In particular, the plastic preforms are dammed up in the damming device and preferably touch each other at their support rings.

In a preferred embodiment, the damming device has two driven circumferential conveyor belts, which are arranged parallel to each other and which are suitable and intended to transport the plastic preforms. The conveyor belts are preferably designed in such a way that they have a distance to each other which is so large that a base body of the preforms can pass through the gap formed by the distance between the conveyor belts, but not a support ring of the plastic preforms. The distance between the conveyor belts can be adjusted or changed so that performs with different body diameters can be transported.

The conveyor belts are particularly preferably driven metal belts which are guided circumferential around two rollers, the first roller preferably being a deflection roller and the second roller a drive roller. The feeding of the plastic preforms to the heating device and/or to the transport star arranged between the preform sorting device and the heating device can therefore preferably also be carried out via conveyor belts.

Preferably, the preform sorting device is designed in such a way that the sorting device or sorting section has two parallel rollers and the damming device or damming section has conveyor belts. Accordingly, the plastic preforms are preferably transported in the sorting device with rollers and in the damming device with conveyor belts.

However, in preferred embodiment it is also conceivable that the damming device has two rotatable rollers arranged parallel to each other, which are suitable and intended for transporting the plastic preforms.

In a particularly preferred embodiment, both the damming device and the sorting device have two rotatable rollers arranged parallel to each other, which are suitable and intended for transporting the plastic preforms, wherein the rollers of the sorting device and the rollers of the damming device are directly connected to each other. Preferably, the preform sorting device can therefore also be designed in such a way that the sorting device or sorting section and the damming device or damming section each have two rollers arranged parallel to one another, so that the plastic preforms are preferably transported in the sorting device and the damming device with rollers. The continuation of the rollers is particularly advantageous, since therefor no transitions between the transport section of the sorting device and the transport section of the damming device are created, so that the transfer from the sorting device to the damming device is simplified. The rollers of the sorting device and the rollers of the damming device preferably have different rotational speeds, so that in particular the distance between the plastic preforms in the damming device can be easily reduced. It is particularly preferred that the rotational speed of the rollers can be adjusted or changed.

In another preferred embodiment, the preform sorting device and the heating device are arranged in a common housing. Particularly preferably, the preform sorting device and the heating device are in this case arranged on a common carrier and inside a common housing. This further simplifies the structure and transport of the preform sorting device and the heating device.

In another preferred embodiment, a blow moulding machine is arranged downstream of the heating device, which transforms the plastic preforms into plastic containers after heating in the heating device. The plastic preforms are therefore preferably fed to the blow moulding machine after being heated in the heating device and expanded into plastic containers within blowing stations by the application of a liquid or gaseous medium.

Preferably, the blow moulding machine is a stretch blow moulding machine, which means that the preforms are stretched in longitudinal direction by means of a stretching rod before and/or during expansion. The blow stations are therefore in each case equipped with stretching rods which can be inserted into the plastic preforms and stretch the plastic preforms in their longitudinal direction.

In an advantageous embodiment, a plurality of blow stations are arranged on a common movable carrier. This carrier is in particular a rotatable carrier. The blow stations each have a blow moulding device, which preferably form a cavity within which the plastic preforms can be expanded to form the plastic containers. These blow moulding devices are preferably designed in several parts and have two blow mould halves and a base mould. Preferably, these blow mould halves are detachably arranged on a mould support shell or on the blow mould supports. The blow mould carriers can be pivoted relative to each other to open and close the blow mould devices. Additionally, the blow mould carrier also has locking mechanisms to lock the mould halves together during the blowing process.

Particularly preferably, the blow-moulding machine or the carrier and the blow-moulding arrangements, is/are located within a clean room, which separates the blow-moulding machine from a non-sterile environment. The blow moulding devices are preferably also transported within the clean room. The clean room is preferably bounded by several walls. Preferably, the clean room is bounded by at least one stationary wall and one wall that moves with respect to this stationary wall. In particular, the clean room separates the blow moulds from a non-sterile environment. The clean room is advantageously designed in a ring or toroidal shape around the blowing stations or forming stations and/or the transport path of the plastic containers.

The present invention is further directed to a method for treating plastic preforms, comprising a preform sorting device comprising a sorting device and a damming device which transport the plastic preforms in each case along a first rectilinear transport path, wherein the sorting device is suitable and intended to bring the plastic preforms into a predetermined orientation and the damming device is suitable and intended to supply the plastic preforms in an ordered manner to a heating device arranged downstream of the preform sorting device, which heats the plastic preforms to a temperature necessary for blow moulding, wherein the heating device transports the plastic preforms along a substantially second rectilinear transport path and a plurality of heating elements arranged in a stationary manner are arranged along the second rectilinear transport path.

According to the invention, the plastic preforms are transported parallel to each other in the preform sorting device and the heating device and/or the preform sorting device and the heating device are arranged on a common carrier.

It is therefore also proposed on the process side, in order to achieve a more compact arrangement and improved accessibility to the preform sorting device, to arrange it together with the heating unit on a common carrier and, in particular, parallel to the heating unit.

Further advantages and embodiments are shown in the attached drawings.

Figure 3:
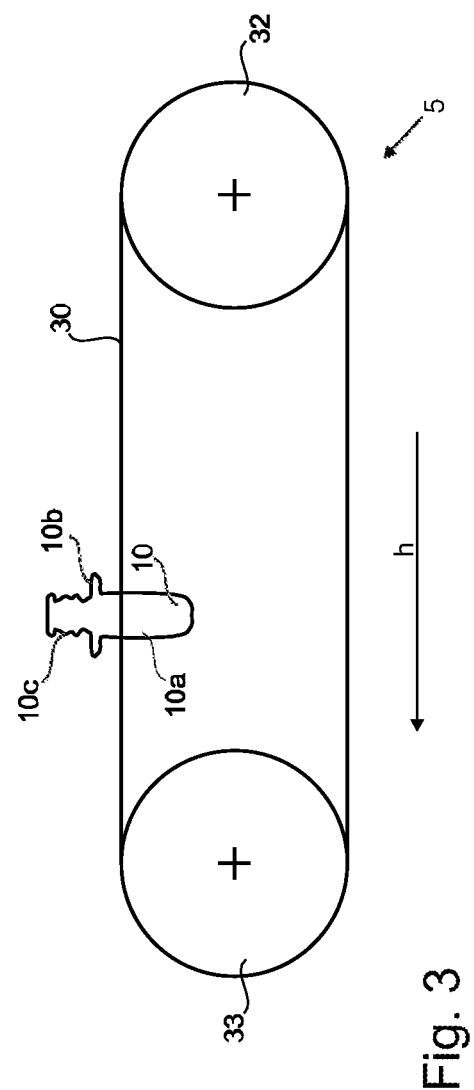

FIG. 3 a side view of a damming device according to the invention.

Figure 1:
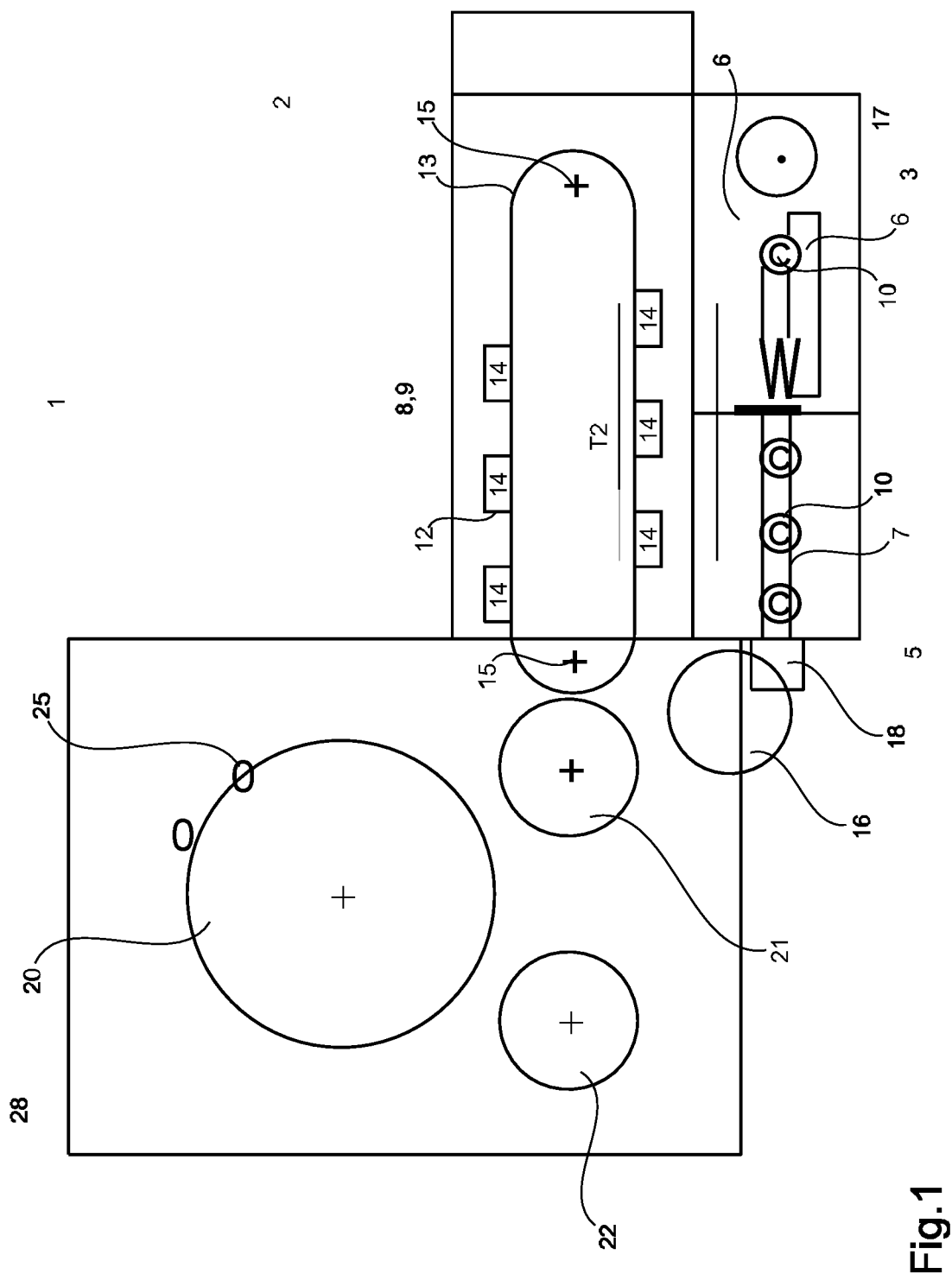
FIG. 1 shows a representation according to the invention of a device for treating plastic preforms.

FIG. 1 shows a representation according to the invention of a device 1 for treating plastic preforms 10. The plastic preforms 10 are fed to the preform sorting device 2 via an insertion star 17 and here first brought into a predetermined orientation in the sorting device 3 and then brought into a predetermined pitch in the damming section 5 and fed to the following heating device 12 via the transport star 16. In this exemplary embodiment, both the sorting device 3 and the damming device 5 each have two parallel rollers 6, 7 between which the plastic preforms are transported.

It can be seen that the first transport section T1 of the preform sorting device 2 and the second transport section T2 of heating device 12 are arranged parallel to each other and run along a horizontal direction h. The heating device 12 has a circumferential transport means 13 which is guided over at least two deflection points 15. A plurality of heating elements 14 for heating the plastic preforms 10 are arranged along the transport section T2 of the heating device 12. The reference signs 8 and 9 schematically identify the common housing (reference signs 8) within which the preform sorting device 2 and the heating device 12 are arranged or the common carrier (reference sign 9) on which the preform sorting device 2 and the heating device 12 are arranged.

The reference sign 18 indicates an infeed stop, which is located at the end of the transport section of the damming device 5 and can block the infeed or the transfer of the plastic preforms to the transport star 16 if required or if necessary.

The reference sign 20 indicates a blow moulding machine in which the plastic preforms 10 are formed into plastic containers after heating. The blow moulding machine 20 has a plurality of blow moulding devices 25 (only two shown here), which are arranged along a rotating carrier. The plastic preforms 10 are fed to the blow moulding machine 20 via a feeding starwheel 21 and discharged from the blow moulding machine 20 as moulded containers via a discharge starwheel 22. The blow-moulding machine 20 is preferably arranged inside a housing 28, wherein this housing 28 preferably forms a clean room. The housing 28 is therefore preferably designed to separate the blow moulding machine 20 from a non-sterile environment.

Figure 2:
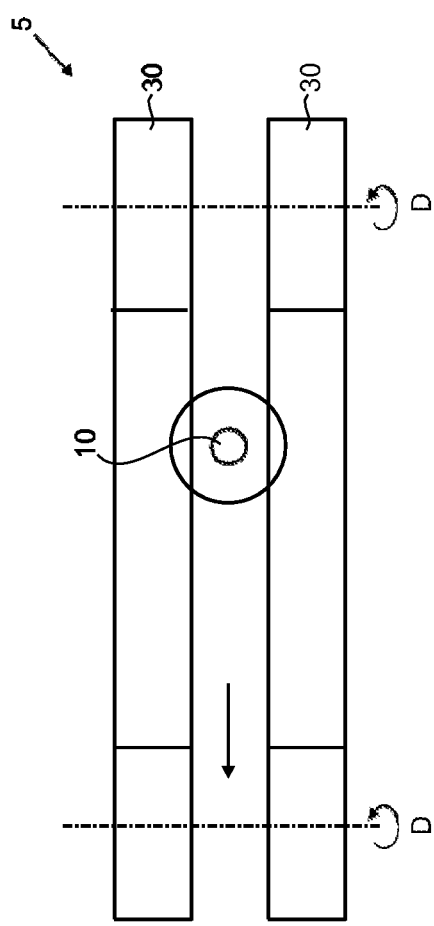
FIG. 2 shows a plan view of a damming device according to the invention.

FIGS. 2 and 3 show a top view and a side view of the damming device 5. In contrast to the embodiment according to FIG. 1, the damming device 5 here has two parallel and spaced conveyor belts 30, between which the plastic preforms 10 are transported and guided. The conveyor belts 30 are guided by a deflection roller 32 and a drive roller 33. The reference sign D in FIG. 2 indicates the direction of rotation of the deflection roller 32 and the drive roller 33.

In particular in the illustration according to FIG. 3 it can be seen that the conveyor belts 30 are arranged in such a way that a basic body 10a of the plastic preforms 10 can pass between the belts, but not the mouth area 10c or the support ring 10b of the plastic preform. The reference sign h again indicates the horizontal direction along which the plastic preforms 10 are transported.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 device
2 preform sorting device
3 sorting device
5 damming device
6 roller
7 roller 8 housing
9 carrier
10 plastic preforms
10a basic body
10b support ring
10c mouth area
12 heating device
13 transport means
14 heating elements
15 deflection point
16 transport star
17 insertion star
18 inlet stop
20 blow moulding machine
21 feeding starwheel
22 discharge starwheel
25 blow moulding device
28 housing
30 conveyor belt
32 deflection roller
33 drive roller
T1 first rectilinear transport path
T2 second rectilinear transport path
h horizontal direction
D direction of rotation

The invention claimed is:

1. Apparatus (1) for treating plastic preforms (10) with a preform sorting device (2) comprising a sorting device (3) and a damming device (5) which transports the plastic preforms (10) along a first rectilinear transport path (T1), wherein the sorting device (3) is suitable and intended to bring the plastic preforms (10) into a predetermined orientation and the damming device (5) is suitable and intended to feed the plastic preforms (10) in an ordered manner to a heating device (12) arranged downstream of the preform sorting device (2), which heats the plastic preforms (10) to a temperature necessary for blow moulding, wherein the heating device (12) transports the plastic preforms (10) along a substantially second rectilinear transport path (T2) and a plurality of heating elements (14) arranged in a stationary manner are arranged along the second rectilinear transport path (T2),
characterised in that
the preform sorting device (2) and the heating device (12) are arranged on a common carrier (9).

2. Apparatus (1) according to claim 1,
characterised in that
the plastic preforms (10) are fed from the preform sorting device (2) to the heating device (12) and in particular to a transport star (16) arranged between the preform sorting device (2) and the heating device (12) in a horizontal direction (h).

3. Apparatus (1) according to claim 1,
characterised in that
in the sorting device (3) and/or the damming device (5) at least one air stressing device is provided, which is suitable and intended to transport the plastic preforms (10) by means of an air flow.

4. Apparatus (1) according to claim 1,
characterised in that
the damming device (5) has two driven circumferential conveyor belts (30) which are arranged parallel to each other and which are suitable and intended for transporting the plastic preforms (10).

5. Apparatus (1) according to claim 1,
characterised in that
the damming device (5) has two rotatable rollers (7) arranged parallel to each other, which are suitable and intended for transporting the plastic preforms (10).

6. Apparatus (1) according to claim 1,
characterised in that
both the damming device (5) and the sorting device (3) have two rotatable rollers (6, 7) arranged parallel to one another, which are suitable and intended for transporting the plastic preforms (10), the rollers (6) of the sorting device (3) and the rollers (7) of the damming device (5) being directly adjacent to one another.

7. Apparatus (1) according to claim 1,
characterised in that
the preform sorting device (2) and the heating device (12) are arranged in a common housing (8).

8. Apparatus (1) according to claim 1,
characterised in that
downstream of the heating device (12), a blow moulding machine (20) is arranged which converts the plastic preforms (10) into plastic containers after heating in the heating device (12).

9. Apparatus (1) for treating plastic preforms (10) with a preform sorting device (2) comprising a sorting device (3) and a damming device (5) which transport the plastic preforms (10) along a first rectilinear transport path (T1), wherein the sorting device (3) is suitable and intended to bring the plastic preforms (10) into a predetermined orientation and the damming device (5) is suitable and intended to feed the plastic preforms (10) in an ordered manner to a heating device (12) arranged downstream of the preform sorting device (2), which heats the plastic preforms (10) to a temperature necessary for blow moulding, wherein the heating device (12) transports the plastic preforms (10) along a substantially rectilinear straight transport path (T2) and a plurality of heating elements (14) arranged in a stationary manner are arranged along the second rectilinear transport path (T2),
characterised in that
the preform sorting device (2) and the heating device (12) are arranged parallel to each other.

10. Apparatus (1) according to claim 9,
characterised in that
the plastic preforms (10) are fed from the preform sorting device (2) to the heating device (12) and in particular to a transport star (16) arranged between the preform sorting device (2) and the heating device (12) in a horizontal direction (h).

11. Apparatus (1) according to claim 9,
characterised in that
in the sorting device (3) and/or the damming device (5) at least one air stressing device is provided, which is suitable and intended to transport the plastic preforms (10) by means of an air flow.

12. Apparatus (1) according to claim 9,
characterised in that
the damming device (5) has two driven circumferential conveyor belts (30) which are arranged parallel to each other and which are suitable and intended for transporting the plastic preforms (10).

13. Apparatus (1) according to claim 9,
characterised in that
the damming device (5) has two rotatable rollers (7) arranged parallel to each other, which are suitable and intended for transporting the plastic preforms (10).

14. Apparatus (1) according to claim 9,
characterised in that both the damming device (5) and the sorting device (3) have two rotatable rollers (6, 7) arranged parallel to one another, which are suitable and intended for transporting the plastic preforms (10), the rollers (6) of the sorting device (3) and the rollers (7) of the damming device (5) being directly adjacent to one another.

15. Apparatus (1) according to claim 9,
characterised in that
the preform sorting device (2) and the heating device (12) are arranged in a common housing (8).

16. Apparatus (1) according to claim 9,
characterised in that
downstream of the heating device (12), a blow moulding machine (20) is arranged which converts the plastic preforms (10) into plastic containers after heating in the heating device (12).

17. A method for treating plastic preforms (10) with a preform sorting device (2) comprising a sorting device (3) and a damming device (5) which transport the plastic preforms (10) in each case along a first rectilinear transport path (T1), wherein the sorting device (3) is suitable and intended to bring the plastic preforms (10) into a predetermined orientation and the damming device (5) is suitable and intended to feed the plastic preforms (10) in an ordered manner to a heating device (12) arranged downstream of the preform sorting device (2), which heats the plastic preforms (10) to a temperature necessary for blow moulding, wherein the heating device (12) transports the plastic preforms (10) along a substantially second rectilinear transport path (T2) and a plurality of heating elements (14) arranged in a stationary manner are arranged along the second rectilinear transport path (T2),
characterised in that
the preform sorting device (2) and the heating device (12) are arranged on a common carrier (9).

* * * * *